March 13, 1951  A. W. VINGERHOETS  2,545,247

MILLIAMPERE-SECONDS RELAY FOR RADIOGRAPHIC CONTROL SYSTEMS

Filed May 4, 1946

INVENTOR
ANTONIUS WILHELMUS VINGERHOETS

BY
AGENT

Patented Mar. 13, 1951

2,545,247

UNITED STATES PATENT OFFICE 2,545,247

MILLIAMPERE-SECONDS RELAY FOR RADIOGRAPHIC CONTROL SYSTEMS

Antonius Wilhelmus Vingerhoets, Eindhoven, Netherlands, assignor, by mesne assignments, to Hartford National Bank and Trust Company, Hartford, Conn., as trustee Application May 4, 1946, Serial No. 667,444
In the Netherlands March 4, 1942

Section 1, Public Law 690, August 8, 1946
Patent expires March 4, 1962

11 Claims. (Cl. 250—95)

The present invention relates to apparatus for measuring a given integral value of the product of current and time in a circuit supplying current to a load.

In certain fields of the electrical engineering, such as the X-ray industry and the welding industry, use is made of devices for measuring a given integral value of the product of current and time. Periodically, on reaching this value expressed in ampere seconds or—if this unit is too large—in milliamperseconds, the current must be switched off. This switching operation may be effected automatically.

Generally, a condenser is used in the measuring device. The voltage at the condenser is proportional to its charge and hence to the integral product to be measured. The value of this product can be read on a meter which registers this voltage and, as an alternative, the condenser may be caused to act as a source of voltage on a relay which responds to a given voltage and acts on a switch by means of which the current is cut off in the load circuit.

It is obvious that the capacity of the measuring condenser should be large enough for the voltage which corresponds with the charge to be measured at intervals to be only a negligible part of the operating voltage because the output of the main source of current would otherwise fall considerably during the charging of the condenser. In the case of an excessively low capacity the measuring condenser would readily develop an excessive counter-electromotive force.

In certain cases it is only possible to satisfy this requirement by a very high capacity and for this reason the method has been adopted both with X-ray apparatus and with welding machines not to connect the measuring condenser directly into the load circuit but to feed the charging current to it across a transformer whose primary is included in the load circuit and whose secondary, which is connected to the measuring condenser via a rectifier, comprises more turns than the primary. It is thus ensured that the counter voltage in the load circuit is lower than the condenser voltage and that as a result thereof the capacity of the measure condenser can be kept within reasonable limits.

A disadvantage of this method is that it is inoperable for pure direct current. Even for pulsating direct current it is not particularly suitable on account of the disadvantage attending the transfer of this current by means of a transformer. The invention relates to a different means of keeping the capacity of the measure condenser sufficiently low in the case of a given admissible counter-voltage due to which the disadvantage of the wellknown method does not arise.

According to the invention, a ballast resistance included in the load circuit and of low value compared with the total resistance of the load circuit has connected to it two or more points of the charging circuit of the measuring condenser, this connection being effected in such manner that the charging current is substantially proportional to the voltage drop in the ballast resistance. From the latter condition it follows that it is not sufficient simply to shunt the condenser by the ballast resistance. In this case, the counter voltage would also be bound to a suitable limit by the resistance, but apart from the fact that frequently in this case a higher capacity than is desirable would nevertheless be required for other reasons the voltage at the condenser would not be proportionate at all to the number of milliamperseconds of the current in the load circuit.

In the simplest form of construction of the device according to the invention the measure condenser has a resistance connected with it in series and the series-combination of resistance and condenser is shunted by the ballast resistance. This series-connected resistance must be high compared with the ballast resistance so that the charging condition of the measuring condenser has little influence on the distribution of the current over the two branches. This ensures the advantage that a condenser of low capacity can be used and nevertheless the voltage curve cuts the line that designates the final value of the voltage under a favourable angle.

In order to ensure that in spite of the counter-voltage which the condenser exerts in the charging circuit with a progressing charge the charging current only varies proportionately to the load current, the voltage drop in the ballast resistance or part thereof may be used as a component of the grid voltage of an electron discharge tube which is connected in series with the measuring condenser and comprises a control electrode. If the part of the ballast resistance that is included in the grid circuit is variable the quantity of milliamperseconds to be measured is consequently variable.

In all cases in which the condenser is charged by part of the load current the measuring voltage is lower than the voltage drop in the ballast resistance. It may be desirable to operate with a higher measure voltage in view of the relay used (whose function may be performed by a discharge tube) or the sensitiveness of the meter. This is possible if the charging current is controlled by an electron discharge tube because this permits of the said current being supplied by a separate source of current. In this case the current may be rendered even less dependent on the charging condition of the condenser by using a tube which comprises a screen grid and placing a constant positive voltage on this grid.

The idea is that the charging current rises and falls exactly in the same ratio as the main current and hence that in the presence of an electron discharge tube the anode current of this tube which is also the charging current of the measuring condenser is proportionate to the grid voltage which in turn is proportionate to the current in the ballast resistance. The accuracy may be assisted by using feedback coupling on the grid of the electron tube. This may be ensured by connecting a resistance in series with this tube on the cathode side. If the end of this resistance is connected to the negative end of the ballast resistance and the grid of the electron valve to a further point of the ballast resistance the latter supplies a positive and the other resistance a negative component of the grid voltage. As is known per se a negative grid voltage proportionate to the anode current permits of achieving proportionality of anode current and positive grid voltage. In this case, the ratio of the currents in the ballast resistance and the condenser branch is substantially determined by the ratio of the resistances and does not alter by reason of the characteristic curve of the electron valve or the charging condition of the measure condenser.

In order that the invention may be clearly understood and readily carried into effect three circuit diagrams will be described more fully as examples of devices according to the invention used in radiographic apparatus.

Figure 1:
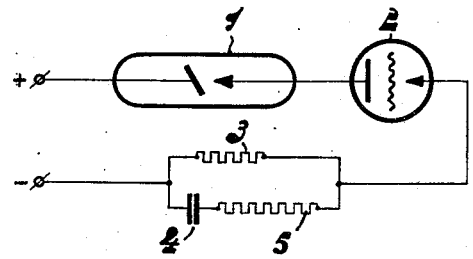
Figure 1 shows a device in which the load current is distributed over two resistances.

In all the figures, 1 designates an X-ray tube and 2 a triode which is connected in series therewith and which may be used for controlling the current and for switching it on and off. The X-ray tube has connected in series therewith a ballast resistance 3. Referring to Figure 1, a measuring condenser 4 is connected in series with a resistance 5 which is large compared with the ballast resistance 3. The series combination of measure condenser and resistance is shunted by the ballast resistance. The current in the resistance 5 thus varies approximately in the same ratio as that in the resistance 3 and the voltage at the condenser 4 is consequently proportional to the number of milliamperseconds of the current that passes through the X-ray tube.

Figure 2:
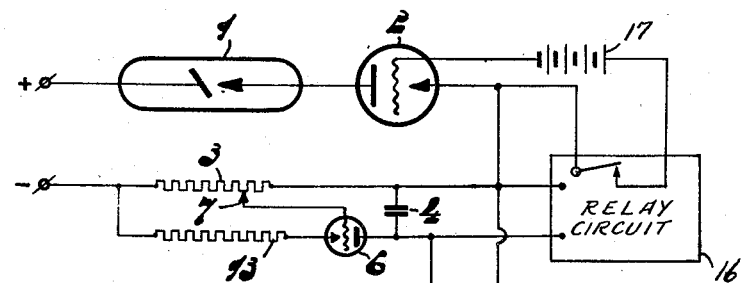
Figure 2 is the diagram of a device comprising a control tube.

In the diagram of Figure 2 a triode 6 serves as a series resistance for the condenser. The influence of the counter-voltage of the condenser on the charging current is thus decreased because the intensity of the charging current is not solely determined in the present case by the difference of the voltages at the ballast resistance and the condenser but in the first place by the grid voltage of the triode 6. This voltage varies with the current in the resistance 3 due to the fact that the cathode of the triode is connected to the negative end of the resistance 3 and the grid to a tap 7 thereof. The measuring voltage establishing across condenser 4 may be indicated by a suitable voltmeter circuit 15 or utilized to actuate a relay circuit 16 adapted to apply cut-off bias from battery 17 on the grid of triode 2 when the measuring voltage has attained a predetermined magnitude. Meter 15 is preferably calibrated in milliamperseconds.

Figure 3:
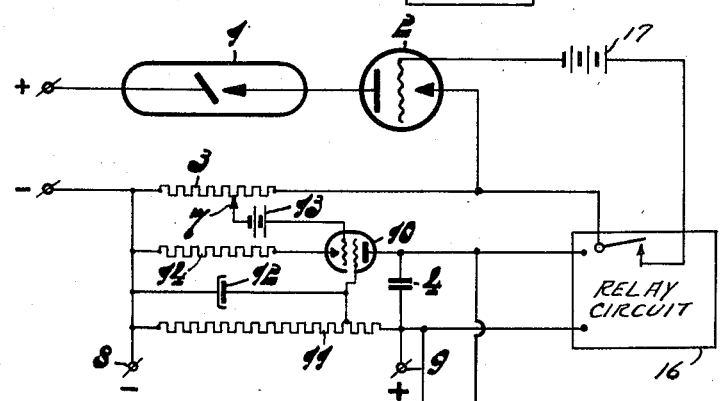
Figure 3 is the diagram of a device in which the charging current is supplied by a separate source of current.

A higher condenser voltage may be obtained by connecting a separate source of current, as shown in Figure 3, which source of current may comprise a transformer and rectifier to be connected between the points 8 and 9 for the supply of the measuring condenser 4. In this case the voltage at the ballast resistance 3 only serves for the control of the charging current. A separate source of charging current also has the advantage that the voltage drop in the ballast resistance can be rendered altogether independent of the condenser voltage, thus being purely proportional to the current in the load circuit. As in the embodiment of Fig. 2, the measuring voltage attained by condenser 4 may be indicated by voltmeter 15 or may be utilized to actuate relay circuit 16 which serves to connect a cut-off bias to the grid of triode 2 when the voltage across condenser 4 has risen to a predetermined value.

The tapping in the resistance 3 may be made variable and this permits of choosing at will the number of milliamperseconds at which the relay to be connected to the condenser responds.

In order that the influence of the condenser voltage on the charging current may be eliminated even more satisfactorily the triode is replaced in Figure 3 by a screen-grid valve tube. The screen grid is given a constant positive voltage derived from the potentiometer 11. Variations in this voltage due to the supply with alternating current are absorbed by a condenser 12.

A source of voltage 13 serves to cause the tube 10 to operate in the suitable point of its characteristic curve.

In the diagrams of Figures 2 and 3 care is taken that the shape of the characteristic curve of the tubes 6 and 10 does not detract from the proportionality of the charging current and the current in the resistance 3 by including a resistance 14 between the cathode of the control valve and the negative end of the resistance 3. Due to the voltage drop in this resistance feedback coupling is set up on the grid of the valve and the influence of the curvature of the characteristic curve of the tube is eliminated so that the charging current continues proportional to the main current within wide limits.

What I claim is:

1. A system for developing a measuring voltage proportional to the integral value of the product of current and time in a load circuit, said system comprising a resistance serially connected to said load circuit, the voltage developed across said resistance depending on the intensity of current flow in said load circuit, the value of said resistance being low relative to the resistance of said load circuit, an integrating network including a capacitance connected in series with an electron discharge tube having a cathode, a control electrode and an anode, means to apply a charging potential across said network, and means to apply a portion of the voltage developed across said resistance between said cathode and said control electrode to control the charging current of said network substantially in proportion to the voltage developed across said resistance, whereby a measuring voltage is developed across said capacitance.

2. Apparatus for measuring the integral value of the product of current and time in a load circuit, said apparatus comprising a resistance serially connected to said load circuit, the voltage developed across said resistance depending on the intensity of current flow in said load circuit, the value of said resistance being low relative to the resistance of said load circuit, an integrating network including a capacitance connected in series with an electron discharge tube having a cathode, a control electrode and an anode, means to apply a charging potential across said network, means to apply a portion of the voltage developed across said resistance between said cathode and said control electrode to control the charging current of said network substantially in proportion to the voltage developed across said resistance, and means to measure the voltage developed across said capacitance.

3. A system for developing a measuring voltage proportional to the integral value of the product of current and time in a load circuit, said system comprising a resistance serially connected to said load circuit, the voltage developed across said resistance depending on the intensity of current flow in said load circuit, the value of said resistance being low relative to the resistance of said load circuit, and an integrating network including a capacitance connected in series with an electron discharge tube having a control electrode, said series-connected capacitance and tube being coupled across said resistance, said electrode being connected to a point on said resistance at which the charging current in said network is controlled substantially in proportion to the voltage developed across said resistance, whereby the measuring voltage is developed across said capacitance.

4. Apparatus for measuring the integral value of the product of current and time in a load circuit, said apparatus comprising a resistance serially connected to said load circuit, the voltage developed across said resistance depending on the intensity of current flow in said load circuit, the value of said resistance being low relative to the resistance of said load circuit, an integrating network including a capacitance connected in series with an electron discharge tube having a control electrode, said series-connected capacitance and tube being coupled across said resistance, said control electrode being connected to a point on said resistance at which the charging current in said network is controlled substantially in proportion to the voltage developed across said resistance, and means to measure the voltage developed across said capacitance.

5. Apparatus for measuring the integral value of the product of current and time in a load circuit, said apparatus comprising a ballast resistance serially connected to said load circuit, the voltage developed across said resistance depending on the intensity at current flow in said load circuit, the value of said ballast resistance being low relative to the resistance of said load circuit, a capacitance having one electrode connected to one end of said ballast resistance, an electron discharge tube having a cathode, a control grid and an anode, a negative feedback resistance, said cathode being connected through said feedback resistance to the other end of said ballast resistance, said grid being connected to an intermediate point on said ballast resistance at which the charging current through said capacitance is controlled substantially in proportion to the voltage developed across said resistance, said anode being connected to the other electrode of said capacitance, and means to measure the voltage developed across said capacitance.

6. In combination with a load circuit including cut-off switching means, apparatus responsive to a predetermined integral value of the product of current and time in said load circuit for actuating said switching means, said apparatus comprising a ballast resistance serially connected to said load circuit, the voltage developed across said resistance depending on the intensity at current flow in said load circuit, the value of said ballast resistance being low relative to the resistance of said load circuit, a capacitance having one electrode connected to one end of said ballast resistance, an electron discharge tube having a cathode, a control grid, and an anode, a negative feedback resistance, said cathode being connected through said feedback resistance to the other end of said ballast resistance, said grid being connected to an intermediate point on said ballast resistance at which the charging current through said capacitance is controlled substantially in proportion to the voltage developed across said resistance, said anode being connected to the other electrode of said capacitance, and means responsive to a predetermined value of voltage developed across said capacitance for actuating said cut-off switching means.

7. A radiographic control system comprising an X-ray device, a control discharge tube having a control electrode, a ballast resistance having an adjustable tap, a power source for energizing said X-ray device, said power source being connected to said X-ray device through said ballast resistance and said control tube, the voltage developed across said resistance depending on the intensity at current flow in said load circuit, a capacitance having one terminal connected to one end of said ballast resistance, an electron discharge tube having a cathode, a control grid and an anode, a negative feedback resistance, said cathode being connected through said feedback resistance to the other end of said ballast resistance, said grid being connected to said adjustable tap to control a charging current in said capacitance substantially in proportion to the voltage developed across said resistance, said anode being connected to the other terminal of said capacitance, and means responsive to a predetermined value of voltage developed across said capacitance for applying a cut-off bias to said control electrode of said control tube.

8. A system for developing a measuring voltage proportional to the integral value of the product of current and time in a load circuit, said system comprising a resistance serially connected to said load circuit, the voltage developed across said resistance depending on the intensity at current flow in said load circuit, the value of said resistance being low relative to the resistance of said load circuit, an integrating network including a capacitance in series with an electron discharge tube having a control electrode, a source of charging potential connected across said network, and means to apply a portion of the voltage developed across said resistance to said control electrode to control the charging current of said network substantially in proportion to the voltage developed across said resistance, whereby a measuring voltage is established across said capacitance.

9. A system for devloping a measuring voltage proportional to the integral value of the products of current and time in a load circuit, said system comprising a ballast resistance serially connected to said load circuit, the voltage developed across said resistance depending on the intensity at current flow in said load circuit, the value of said resistance being low relative to the resistance of said load circuit, a capacitance, an electron discharge tube having a cathode, a control grid and an anode, a negative feedback resistance, said cathode being connected through said feedback resistance to one end of said ballast resistance, said control grid being connected to a point of said ballast resistance at which charging current in said capacitance is controlled substantially in proportion to the voltage developed across said resistance, said anode being connected to one terminal of said capacitance, and a source of charging potential connected between the other terminal of said capacitance and said one end of said ballast resistance.

10. A system for developing a measuring voltage proportional to the integral value of the product of current and time in a load circuit, said system comprising a ballast resistance having an adjustable tap and serially connected to said load circuit, the voltage developed across said resistance depending on the intensity at current flow in said load circuit, the value of said resistance being low relative to the resistance of said load circuit, a charge capacitance, an electron discharge tube having a cathode, a control grid, a screen grid and an anode, a negative feedback resistance, a by-pass capacitance, a source of bias voltage, said cathode being connected through said feedback resistance to one end of said ballast resistance, said control grid being connected through said source of bias voltage to said adjustable tap to control charging current in said capacitance substantially in proportion to the voltage developed across said resistance, said screen grid being coupled through said by-pass capacitance to said one end of said ballast resistance, said anode being connected to one terminal of said charge capacitance, and a source of charging potential having an intermediate tap, said source being connected between the other terminal of said charge capacitance and said one end of said ballast resistance, said intermediate tap being connected to said screen grid.

11. A radiographic control system comprising an X-ray device, a control discharge tube having a control electrode, a ballast resistance having an adjustable tap, a power source for energizing said device, said power source being connected to said device through said control tube and said ballast resistance, the voltage developed across said resistance depending on the intensity at current flow in said load circuit, a charge capacitance, an electron discharge tube having a cathode, a control grid, a screen grid and an anode, a negative feedback resistance, a by-pass capacitance, a source of bias voltage, said cathode being connected through said feedback resistance to one end of said ballast resistance, said control grid being connected through said source of bias voltage to said adjustable tap to control charging current in said capacitance substantially in proportion to the voltage developed across said resistance, said screen grid being coupled through said by-pass capacitance to said one end of said ballast resistance, said anode being connected to one terminal of said charge capacitance, a source of charging potential having an intermediate tap, said source of charging potential being connected between the other terminal of said charge capacitance and said one end of said ballast resistance, said intermediate tap being connected to said screen grid, and means responsive to a predetermined value of voltage developed across said charge capacitance for applying a cut-off potential to said control electrode of said control tube.

ANTONIUS WILHELMUS VINGERHOETS.

REFERENCES CITED

The following references are of record in the file of this patent:

UNITED STATES PATENTS

| Number | Name | Date |
|---|---|---|
| 1,871,787 | Goldsborough | Aug. 16, 1932 |
| 2,021,766 | Bivens | Nov. 19, 1935 |
| 2,139,474 | Shepard, Jr. | Dec. 6, 1938 |
| 2,162,239 | Beuermann | June 13, 1939 |
| 2,300,198 | Brown | Oct. 27, 1942 |
| 2,353,980 | Weisglass | July 18, 1944 |
| 2,400,571 | Olesen | May 21, 1946 |